Figure 1:
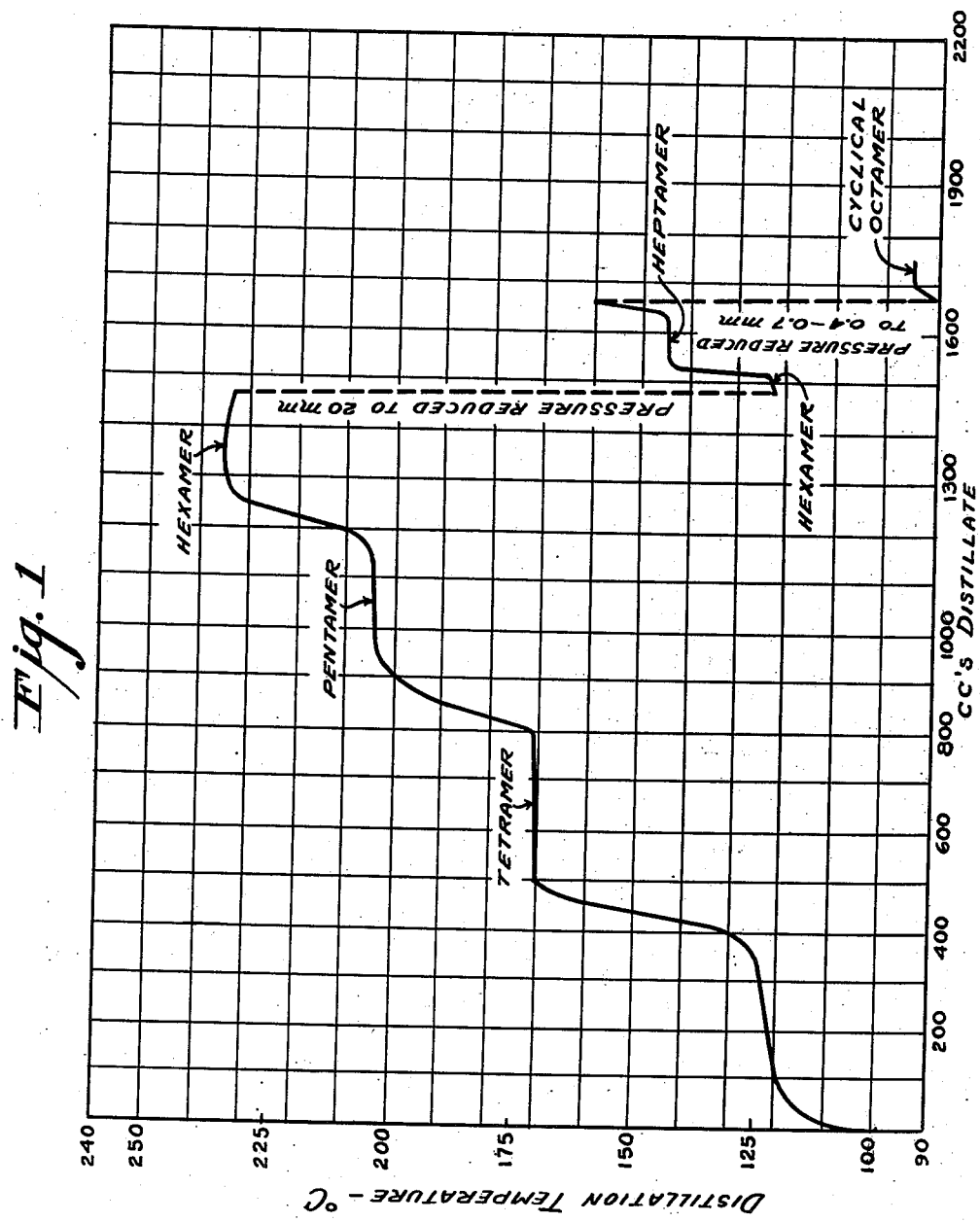

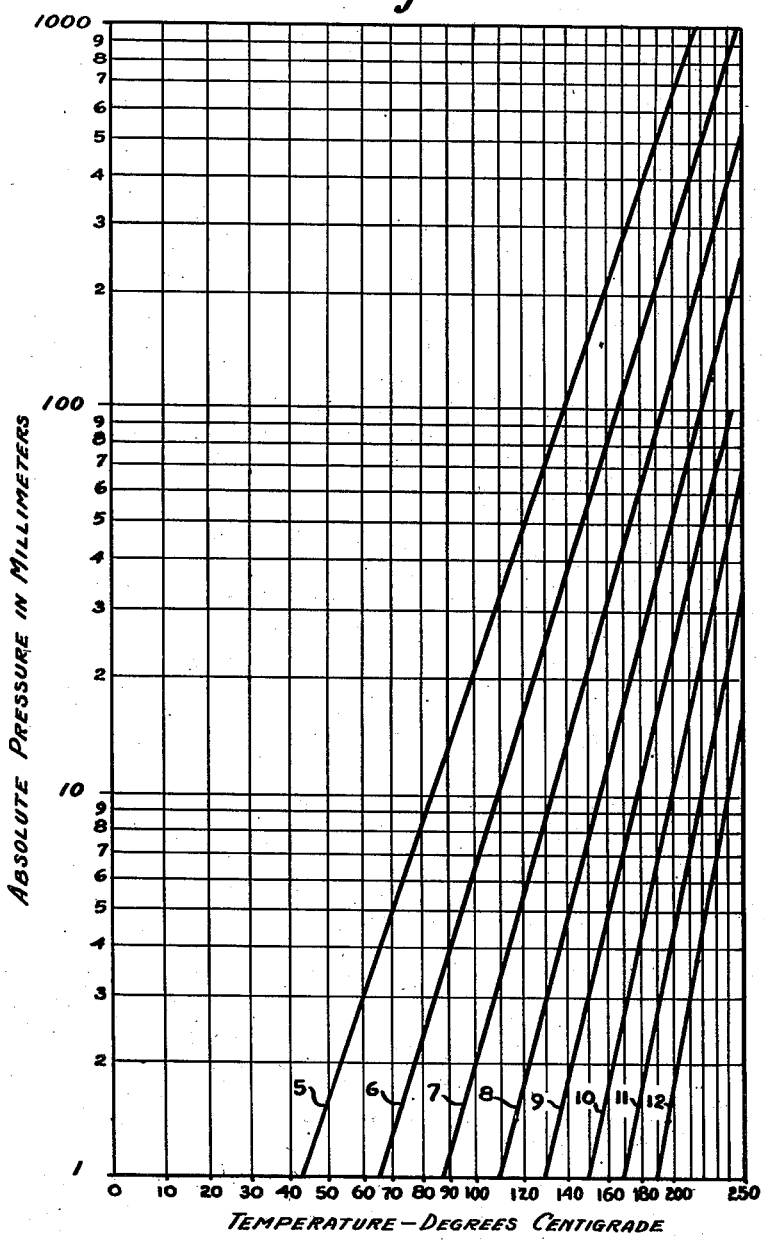

Patented Apr. 20, 1948

2,439,856

UNITED STATES PATENT OFFICE 2,439,856

DIMETHYL SILICONE POLYMERS AND METHODS OF MAKING THEM

Rob Roy McGregor, Verona, and Earl Leathen Warrick, Pittsburgh, Pa., assignors to Corning Glass Works, Corning, N. Y., a corporation of New York Application June 10, 1943, Serial No. 490,348

6 Claims. (Cl. 260—448.2)

This invention relates to organo-silicon compounds and methods of preparing them and, more particularly, to polymers of dimethyl silicone and their preparation.

This application is a continuation-in-part of our copending application Serial Number 432,530, filed February 26, 1942, now U. S. Patent 2,384,384, dated September 4, 1945, and assigned to the assignee of the present invention.

Dimethyl silicone is a compound which exists, so far as is now known, only in the polymeric form. It possesses the unit structure

In the above mentioned co-pending application, methods were disclosed for preparing a mixture of dimethyl silicone polymers which had on the average a high molecular weight. It was shown in that application that the polymeric mixture contained varying amounts of relatively low molecular weight distillable cyclic polymers. Methods were described for removing these cyclic polymers so as to leave a high molecular weight mixture having certain desired properties. These cyclic polymers possess desirable properties for certain commercial applications. Accordingly, it would be desirable if a method were provided for preparing the distillable cyclic polymers in a pure state.

The primary object of our invention is to provide a method of preparing the cyclic polymers of dimethyl silicone.

Another object of our invention is to prepare and isolate new cyclic polymers of dimethyl silicone.

For a fuller understanding of the nature and objects of the invention, reference may be had to the following detailed description, taken in conjunction with the accompanying drawings, in which:

Fig. 1 is a distillation curve of a mixture of several dimethyl silicone polymers of our invention; and Fig. 2 is a collection of vapor pressure curves of the polymers of our invention.

In accordance with our invention, we have provided a method of preparing cyclic polymers of dimethyl silicone which comprises hydrolyzing dimethyldiethoxysilicane. The hydrolysis may be conducted in various ways and, although the resulting liquid will invariably have the same chemical composition, its chemical structure and the physical properties dependent thereon can be varied substantially. In general, the use of a catalyst for promoting hydrolysis and the use of heat during hydrolysis or during the subsequent drying of the product will increase its viscosity.

Preferably, hydrolysis is carried out in the presence of an acid catalyst by mixing one volume of the dimethyldiethoxysilicane with one volume of a mixture of 95% ethyl alcohol and concentrated aqueous hydrochloric acid in equal parts. Although any acid may be used, we prefer to use acids which are easily removed by washing or which are decomposed by heat, such as hydrochloric, oxalic, acetic or trichloracetic acids. Any concentration of acid may be used and for a given acid the higher the concentration the higher the viscosity of the resulting liquid.

The temperature at which the hydrolysis is carried out will also affect the viscosity of the resulting liquid and the higher the temperature the higher the viscosity or the more speedily does the liquid attain a given viscosity. Hydrolysis may be effected at room temperature in about eighteen hours but, preferably, the reaction mixture is refluxed for about four to eight hours after which it is poured into water and the product separates. The oily layer is washed free from acid and alcohol and is thereafter dried.

Drying may be accomplished without the use of heat by treating the liquid at room temperature with a drying agent such as anhydrous sodium sulfate. When thus dried, the liquids which result from hydrolysis at room temperature have a viscosity of about 100 Saybolt seconds at 25° C. Liquids prepared without the use of a catalyst and without the application of heat will have still lower viscosities. If desired, the liquids may be dried and partially dehydrated by heating them at about 120° C., or over, preferably under reduced pressure whereby the viscosities may range from 200 to 1000 or more Saybolt seconds at 25° C., the viscosity increasing with time and/or temperature of drying.

The liquids prepared by the above described process are mixtures of dimethyl silicone polymers having the unit structure hereinbefore referred to. They are soluble in organic solvents such as benzene, toluene, etc. Analysis shows that they contain 37.7% silicon and 32.3% carbon, which corresponds to the ratio of two carbon atoms per silicon atom. The corresponding theoretical amounts for $(CH_3)_2SiO$ are 37.8% Si and 32.4% carbon.

We have found that by heating the liquid products above described to 250° C. at 4 mm. pressure low polymers may be distilled off and collected. These polymers comprise for the most part cyclic polymers of dimethyl silicone having up to 13 silicon atoms per molecule and may be separated by fractional distillation as described in our copending application Serial Number 432,530 filed February 26, 1942, and now U. S. Patent 2,384,-384, dated September 4, 1945, into fractions comprising the several cyclic polymers. We have discovered that if the mixture of low polymers is refluxed before fractional distillation for two to five hours with a 20% hydrohalic acid such as hydrochloric and then washed free of acid, cyclic polymers can be separated from the mixture by fractional distillation in an extremely high state of purity. A possible explanation for this behaviour is that the acid converts the non-cyclic lower polymers to higher polymers which are not distillable within the boiling range of the cyclics. We have further observed that by this 20% acid treatment the trimer of dimethyl silicone is converted to higher molecular weight material since very little of it is found following the acid treatment.

In Fig. 1 of the drawings there is shown a distillation curve of a mixture of the distillable polymers which had been subjected to the 20% acid treatment. Temperature in degrees centigrade is plotted against volume in cc. of distillate. Up to about 235° C. the pressure was atmospheric. At that point the pressure was reduced to 20 mm. At 160° C. and 20 mm. pressure, the pressure was further reduced to less than 1 mm. The several plateaux represent boiling points of those polymers which we have found to possess particularly useful properties. The fractions were analyzed and their molecular weights determined. The results established the fractions to consist of the polymers indicated in the graph.

In Fig. 2 of the drawings are shown the vapor pressure curves of the dimethyl silicone polymers having from 5 to 12 silicon atoms per molecule. The number associated with each vapor pressure curve refers to number of silicon atoms in the polymer to which that curve applies.

In the following table are shown some of the physical properties of the cyclic dimethyl silicones.

are listed the temperature-viscosity slopes of certain of the polymers. By temperature-viscosity slope is meant the value of the expression $$\frac{\Delta \log N}{\Delta 1/T}$$

where N is viscosity and T the absolute temperature. The temperature-viscosity slope of a representative petroleum oil SAE 70 is also given. The lower the value of the slope, the smaller is the change of viscosity with temperature.

Table II

| Temp., ° C. | Pentamer | Hexamer | Heptamer | Octamer |
|---|---|---|---|---|
| 25 | 3.87 | 6.62 | 9.47 | [1] 13.23 |
| 50 | 2.38 | 3.98 | 5.58 | 7.7 |
| 75 | 1.70 | 2.68 | 3.64 | 4.6 |
| 100 | 1.29 | 1.85 | 2.49 | 3.3 |
| 145 | 0.89 | 1.17 | 1.46 | 1.7 |

[1] Supercooled.

Table III

| | |
|---|---|
| Pentamer | 719 |
| Hexamer | 811 |
| Heptamer | 862 |
| Octamer | 964 |
| Petroleum oil | 2300 |

The above described cyclic polymers are substantially completely dehydrated and are accordingly not easily polymerized by heat alone. They oxidize with difficulty. Rubber does not swell, shrink, nor become embrittled when in contact with the liquid polymers for extended periods of time. Their viscosity-temperature coefficients as shown in Table III are relatively low. They have extremely low viscosities as compared with the high molecular weight chain polymers of dimethyl silicone. The above properties adapt these polymers for use as hydraulic fluids, damping media, heat transfer media, etc., preferably for those applications where a relatively low viscosity fluid is desired.

We claim:

1. In a method for isolating cyclic polymers of dimethyl silicone, the steps of hydrolyzing dimethyldiethoxysilane in the presence of an acid, distilling the hydrolysis product to recover the low polymers boiling below 250° C. at 4 mm. pressure, treating said low polymers with aqueous hydrohalic acid and fractionally distilling the product to separate the cyclical polymeric dimethyl silicones having up to 13 Si atoms per molecule.

2. In a method for isolating cyclic polymers of dimethyl silicone, the steps of hydrolyzing Table I

| Unit | Boiling Point, ° C. | Melting Point, ° C. | Centistokes Viscosity at 25° C. | Density at 25° C. | Refractive Index at 25° C. | Flash Point |
|---|---|---|---|---|---|---|
| Pentamer | 204.5 | −44.0 | 3.87 | 0.9531 | 1.3958 | 170° F. 77° C. |
| Hexamer | 125 at 20 mm | −3.0 | 6.62 | 0.9613 | 1.3996 | 200° F. 93° C. |
| Heptamer | 148 at 20 mm | −32.0 | 9.47 | 0.9664 | 1.4118 | 228° F. 109° C. |
| Octamer | 97 at 0.5 mm | +30.0 | [1] 13.23 | Solid | 1.4039 | 270° F. |
| Nonamer | 130 at 1 mm | | | | | |
| Decamer | 150 at 1 mm | | | | | |
| Undecamer | 169 at 1 mm | | | | | |
| Dodecamer | 189 at 1 mm | | | | | |

[1] Supercooled.

In Table II, which follows, are given the viscosities in centistokes of some of the polymers at several different temperatures. In Table III dimethyldiethoxysilane in the presence of a mineral acid, washing the mixture of polymers so produced, distilling off low polymers up to 250°

C. at 4 mm. pressure, treating said low polymers with aqueous hydrohalic acid, washing the resulting oil and fractionally distilling under reduced pressure to separate cyclical polymeric dimethyl silicones having up to 13 Si atoms per molecule.

3. Cyclic pentamer of dimethyl silicone.
4. Cyclic hexamer of dimethyl silicone.
5. Cyclic heptamer of dimethyl silicone.
6. A liquid cyclic polymer of dimethyl silicone having the formula $[(CH_3)_2SiO]_n$, where $n$ represents an integer from 5 to 7 inclusive.

ROB ROY McGREGOR.
EARL LEATHEN WARRICK.

REFERENCES CITED

The following references are of record in the file of this patent:

UNITED STATES PATENTS

| Number | Name | Date |
|---|---|---|
| 2,258,218 | Rochow | Oct. 7, 1941 |

OTHER REFERENCES

Hyde, "Jour. Asn. Chem. Soc.," vol. 63, pages 1194–6 (1941).

Stock, "Chemical Abstracts," vol. 13, pages 2534–6.

Beilstein, "Handbuch der Org. Chem.," vol. IV, 4th ed., pages 628–9.

Martin, "Jour. Chem. Soc." (London), vol. 95, pages 302 to 314 (1909).

Ladenburg, "Analen," vol. 164, pages 310–315 (1872).